United States Patent [19]
Wagener

[11] Patent Number: 5,711,578
[45] Date of Patent: Jan. 27, 1998

[54] VEHICLE FOOTREST

[76] Inventor: Loren E. Wagener, 252 E. Queen, Albany, Oreg. 97321

[21] Appl. No.: 703,055

[22] Filed: Aug. 26, 1996

[51] Int. Cl.[6] .................................................. A47C 7/50
[52] U.S. Cl. ........................... 297/423.3; 297/423.2
[58] Field of Search .................... 297/423.3, 423.1, 297/423.19, 423.2, 423.22, 423.23, 423.29, 423.4

[56] References Cited

U.S. PATENT DOCUMENTS

| | | | |
|---|---|---|---|
| 40,175 | 10/1863 | Lundberg | 297/423.19 |
| 1,435,744 | 11/1922 | Santaniello | 297/423.2 X |
| 1,748,784 | 2/1930 | Mierley | 297/423.3 X |
| 2,690,788 | 10/1954 | Ames | 297/423.3 X |
| 2,762,422 | 9/1956 | Stratton | 297/423.22 X |
| 4,155,126 | 5/1979 | Classen | 297/423.3 X |

FOREIGN PATENT DOCUMENTS

| | | | |
|---|---|---|---|
| 9530 | of 1903 | United Kingdom | 297/423.2 |
| 887041 | 1/1962 | United Kingdom | 297/423.2 |

*Primary Examiner*—Laurie K. Cranmer
*Attorney, Agent, or Firm*—Eugene D. Farley

[57] ABSTRACT

A vehicle footrest comprises an angled bar having a footrest segment and a support segment. A tubular sheath dimensioned for slidably mounting the bar support segment mounts the bar between extended and retracted positions. Attaching means attach the sheath to a structural member. Releasable locking means releasably interlock the sheath and bar support segment alternately in an operative position in which the footrest segment is presented for use and an inoperative, rest position in which the footrest segment is withdrawn, out of the way.

7 Claims, 4 Drawing Sheets

VEHICLE FOOTREST

BACKGROUND OF THE INVENTION

This invention relates to footrests. It pertains particularly to vehicle footrests for use in trucks, military vehicles, and other heavy duty vehicles customarily used over long operating periods.

The drivers of trucks and other heavy duty vehicles are subject to excessive fatigue of the back and legs as they cruise the highways day-after-day. This is particularly true of the left leg. As a result on vehicles equipped with a clutch pedal the driver is prone to rest his left foot upon the pedal. This results in "riding the clutch", with resultant excessive clutch wear.

It is the general purpose of the present invention to provide a solution to the foregoing problems by providing a footrest for vehicles which has the following advantages:

Adaptability for use in conjunction with drivers' seats of various design.

Efficiency in operation in avoiding or relieving fatigue stresses.

Adjustability between an operating position in which it effectively supports the foot and leg of the user and a rest position in which it is retracted and out of the way.

Self-locking capability in its operating position.

Ease of adjustment between its two positions.

Ease of installation, low cost, and long service life with minimal maintenance requirements.

SUMMARY OF THE INVENTION

The foregoing and other purposes of the present invention are provided by the combination with a seat structure, particularly a vehicle seat structure, and a footrest comprising an angled bar having a footrest segment and a support segment. A tubular sheath slidably mounts the bar support segment between extended and retracted positions.

Attaching means attach the sheath to a structural member such as the base which underlies the seat.

Releasable interlocking means releasably interlock the sheath and bar support segment in predetermined operative relation to each other. When the sheath and bar support segment are interlocked, the footrest segment is elevated and extended forwardly of the seat, where it may be used conveniently and effectively by the seat occupant. However, when the interlocking means is released, the footrest segment is withdrawn to its inoperative position, out of the way.

THE DRAWINGS

DESCRIPTION OF PREFERRED EMBODIMENTS OF THE INVENTION

Figure 1:
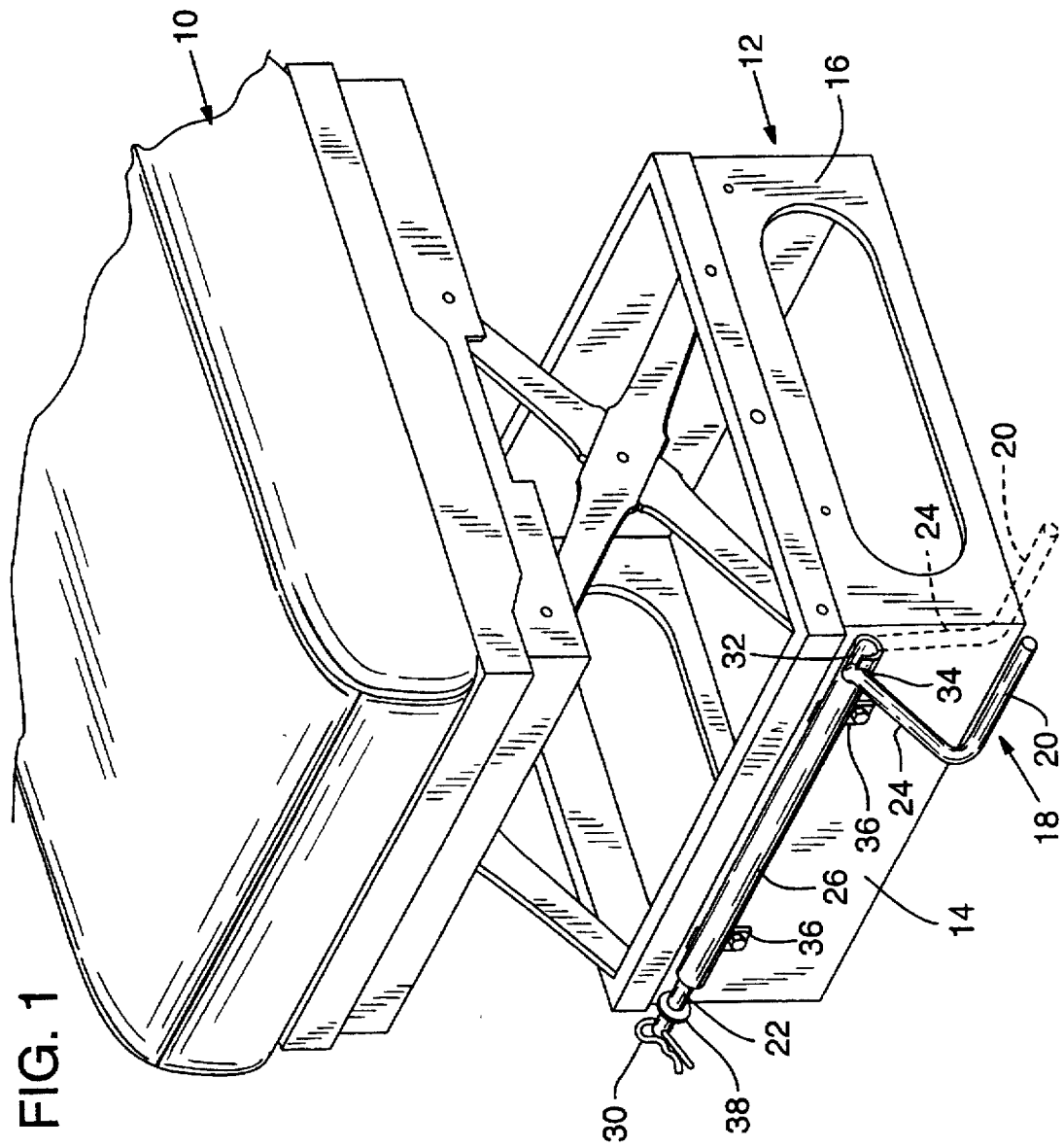
FIG. 1 is a top perspective view of the vehicle footrest of the invention in a first embodiment, shown attached to the front face of a vehicle seat structure.
Figure 2:
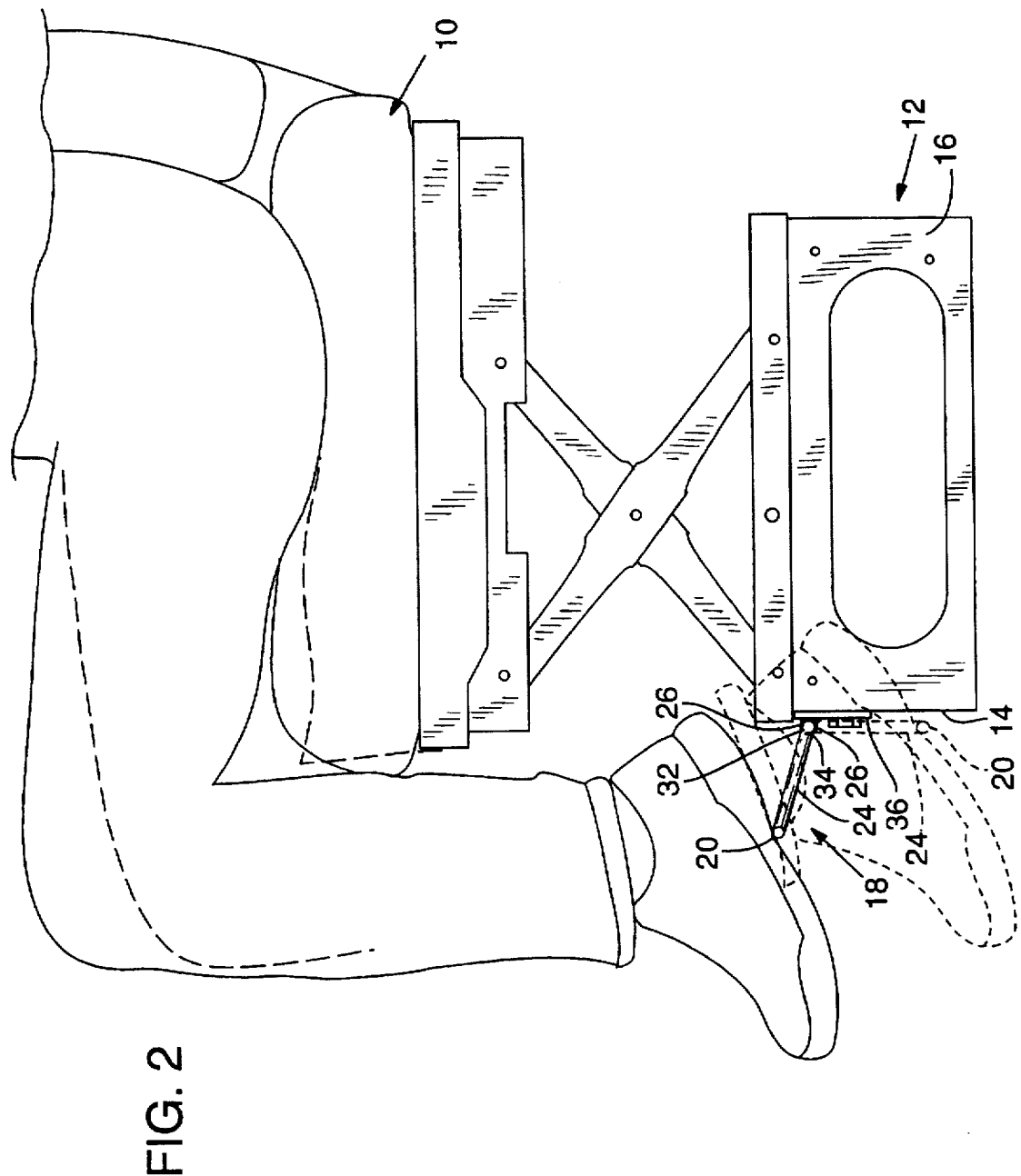
FIG. 2 is a view in side elevation of the footrest of FIG. 1.

The Embodiment of FIGS. 1 and 2

In FIGS. 1 and 2, the footrest of the invention is shown in combination with a seat structure comprising a seat 10 and a base 12. The latter is shown with a front face 14 and a side face 16. The herein described footrest is shown mounted on the front face 14 of the base.

The footrest comprises an angled bar indicated generally at 18. The bar is round in cross section and is comprised of three segments: A footrest segment 20, a support segment 22 and a connecting segment 24. The footrest and support segments are substantially parallel to each other, in a horizontal position.

The support segment of the bar is journaled in a round tubular sheath 26, which mounts it slidably in the axial direction. A stop 28 is fixed to the bar support segment in a position predetermined to limit its degree of axial movement. A cotter key 30 at the end of the bar support segment secures the bar in the sheath.

Releasable interlocking means interlock the bar and the sheath in the solid line operative position of FIG. 1, while permitting its adjustment to the out-of-the-way, inoperative, dashed line position of that figure.

To this end the terminal portion of sheath 26 is provided with a slot 32 having at right angles thereto a communicating locking pocket 34. These elements of the sheath are dimensioned to receive the connecting segment 24 of bar 18.

The assembly is completed by means of a pair of brackets 36 by means of which the sheath is bolted to a structural member, e.g. the front face 14 of base 12.

In operation, the bar is shifted from its inoperative, dashed line, rest position of FIG. 1 to its elevated, operative solid line position of that figure simply by rotating footrest segment 20 upwardly to permit entry of bar connecting segment 24 into slot 32. The bar then is moved in the inward axial direction until it is opposite pocket 34 into which it may be permitted to gravitate. It is mainted there by the pressure exerted by the foot of the riser.

To return the footrest segment to its inoperative position, the foregoing routine simply is reversed. The shifting from one position to another may be accomplished manually, or by a simple manipulation of the seat occupant's foot.

Figure 3:
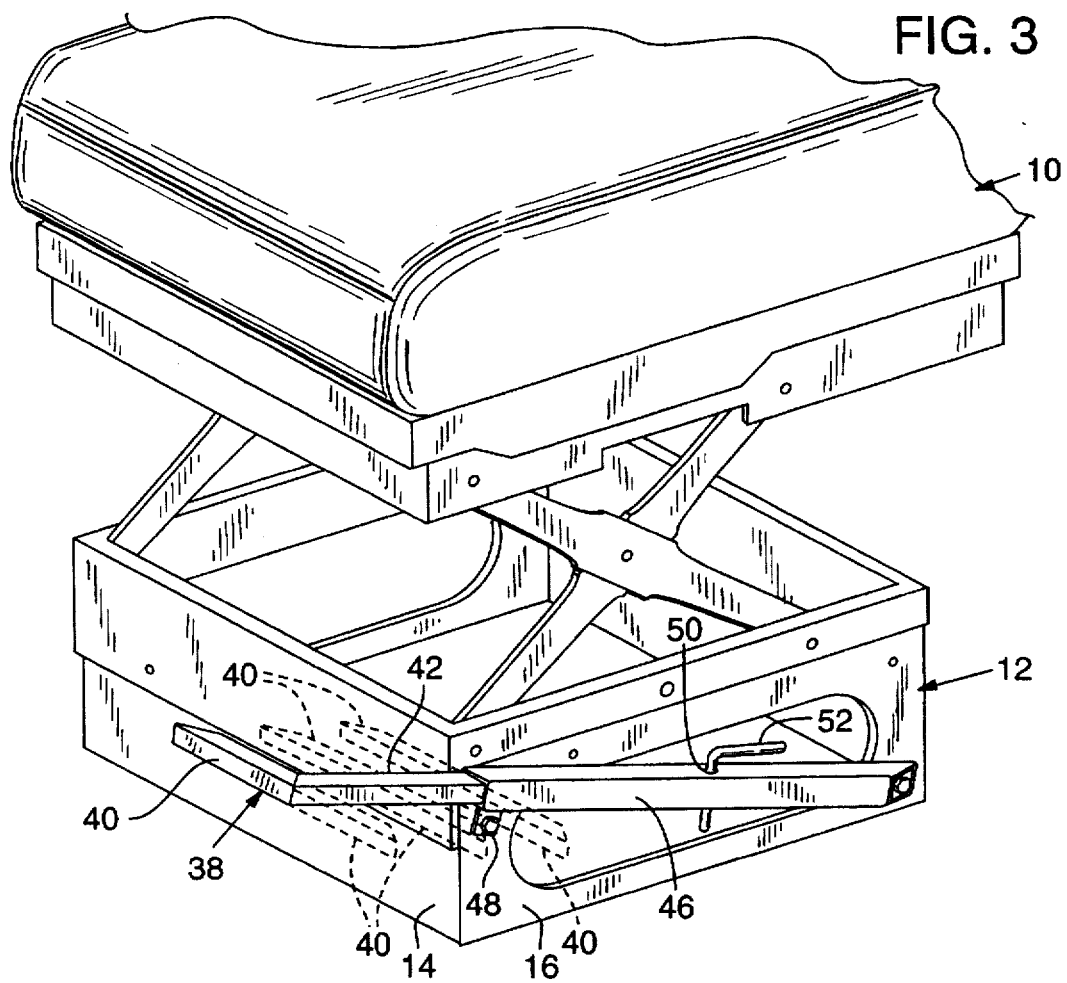
FIG. 3 is a top perspective view of the footrest of the invention in a second embodiment shown attached to the side face of a vehicle seat structure.
Figure 5:
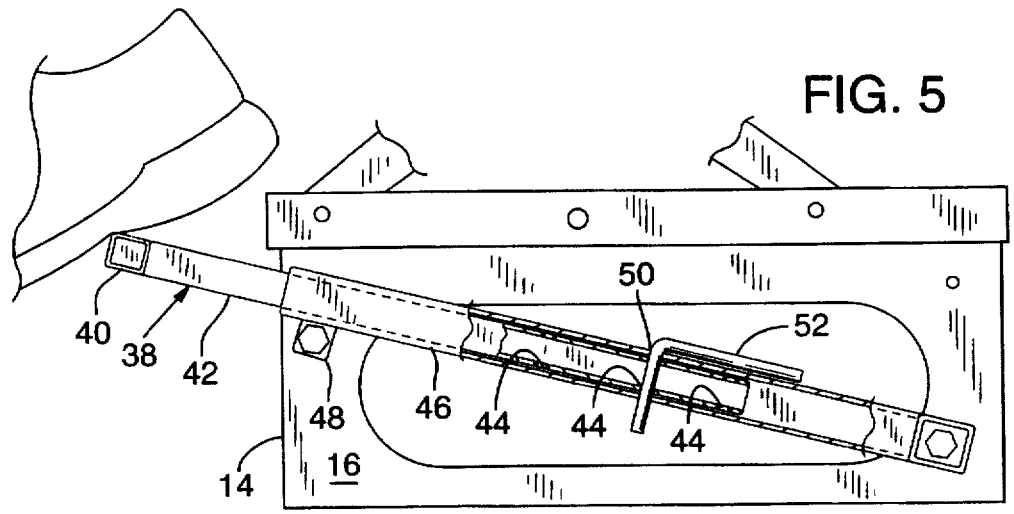
FIGS. 4 and 5 are views of the footrest of FIG. 3 in side elevation, FIG. 5 being a fragmentary enlarged view.
Figure 4:
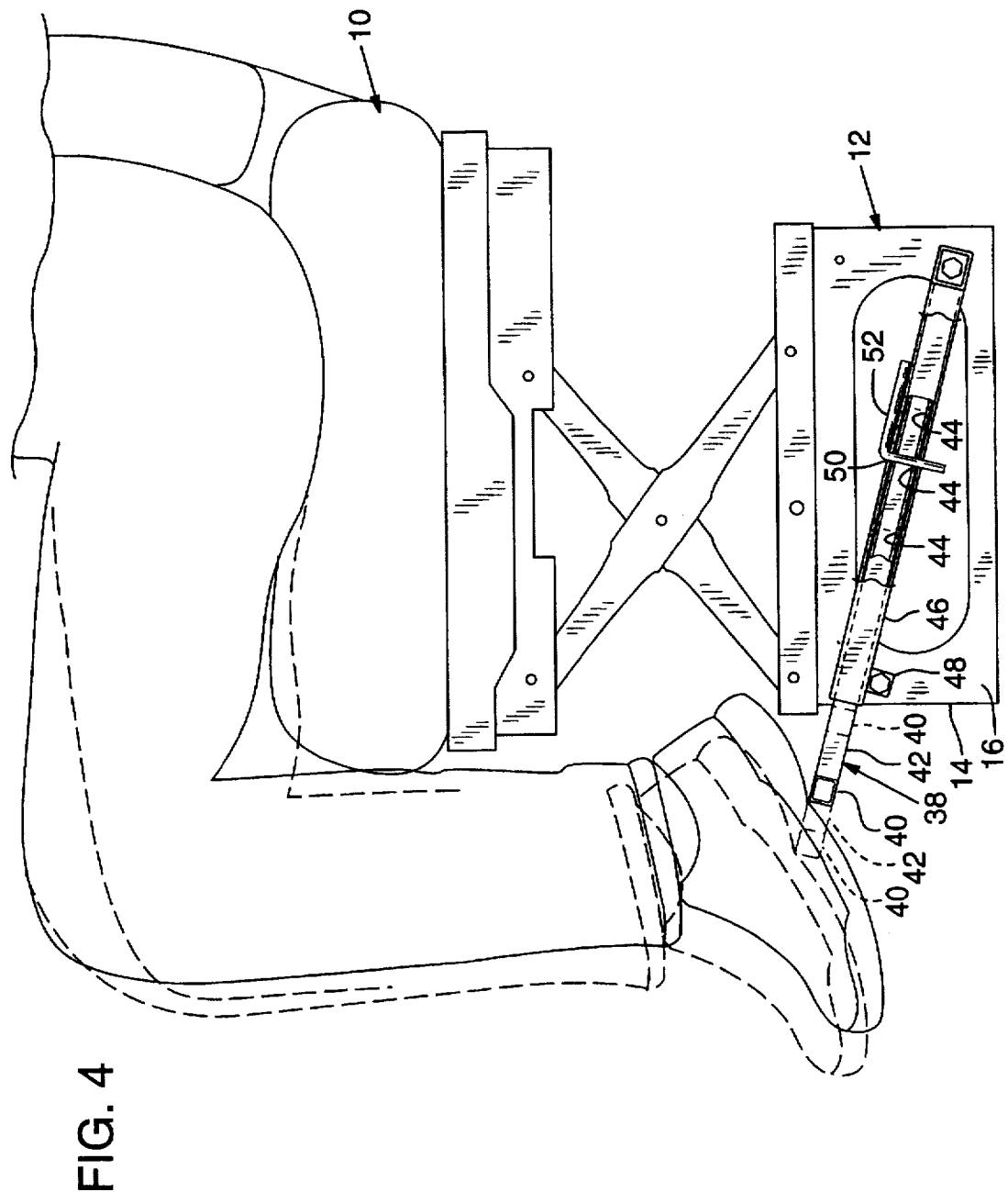

FIGS. 3-5 show another version of the bar-sliding-in-a-sheath concept of the embodiment of FIGS. 1 and 2. This version is illustrated in conjunction with a seat structure comprising a seat 10 adjustably mounted on a base 12. The base has a front face 14 and a side face 16.

The footrest of this embodiment includes a bar indicated generally at 38 and comprising a footrest segment 40 and a mounting segment 42. The bar is angular in cross section, rectangular in the embodiment shown. The bar is illustrated as a hollow bar, although it may, of course, be a solid bar as well. At spaced intervals it is provided with a series of transverse openings 44.

Bar 38 is mounted slidably in the axial direction in a tubular sheath 46. This is bolted to the side face 16 of the seat base by means of brackets 48. Alternatively, it may be bolted to existing openings in the seat base, where such are present.

Releasable interlocking means interlock the bar in selected positions of axial adjustment relative to the sheath.

To this end, the sheath is provided with an opening 50 which is substantially co-dimensional with openings 44 in the bar. A key 52 is provided which is dimensioned for insertion in the respective openings in bar and sheath when the openings are in alignment with each other.

By this means, easy adjustment of the footrest is obtained between its extended, full line, operative position, its intermediate, operative dashed line position and its retracted dashed line rest position, all of FIG. 3.

Having thus described in detail preferred embodiments of the invention, it will be apparent to those skilled in the art that various physical changes may be made without altering the inventive concepts and principles embodied. The present embodiments therefore are to be considered as illustrative and not restrictive, the scope of the invention being indicated by the appended claims.

I claim:

1. In combination with a seat structure having a seat mounted vertically above an underlying fixed supporting base secured to an underlying support and provided with a front side and opposite lateral sides, a footrest comprising:
   a) a single tubular sheath secured to the outer side of one of said front and opposite lateral sides of the fixed base,
   b) a single angled bar having a footrest segment and a support segment, the support segment being mounted in the single sheath for movement of the footrest segment between an extended position projecting forwardly of the base and elevated above said underlying support and a retracted position closely adjacent the front side of the base, and
   d) releasable interlocking means for securing the angled bar and sheath together releasably in the extended position of the footrest segment.

2. The combination of claim 1 wherein the support segment of the angled bar is mounted in the sheath for rotational movement between said extended and elevated and said retracted position.

3. The combination of claim 1 wherein the sheath is secured to and extends parallel to the front side of the base and the support segment of the angled bar is mounted in the sheath for rotational movement between said extended and elevated position and said retracted position.

4. The combination of claim 3 wherein the releasable interlocking means includes an angled slot in the sheath configured to removably receive and secure the angled bar in the extended and elevated position of the footrest segment.

5. The combination of claim 1 wherein the support segment of the angled bar is mounted in the sheath for longitudinal movement between said extended and elevated and said retracted position.

6. The combination of claim 1 wherein the sheath is secured to a lateral side of the base and the support segment of the angled bar is mounted in the sheath for longitudinal movement between said extended and elevated position and said retracted position.

7. The combination of claim 1 wherein the seat structure comprises a truck driver's seat mounted on an underlying base fixed to the body of a truck and the angled bar is mounted for positioning the footrest segment for supporting the left foot of a truck driver in the extended position of the footrest segment.

* * * * *